United States Patent
Bessho et al.

(10) Patent No.: US 10,008,900 B2
(45) Date of Patent: Jun. 26, 2018

(54) ROTATING ELECTRIC MACHINE

(71) Applicant: Mitsubishi Electric Corporation, Tokyo (JP)

(72) Inventors: Tomohiro Bessho, Tokyo (JP); Masashi Nakamura, Tokyo (JP); Keisuke Murase, Tokyo (JP); Toshiki Kuwahara, Tokyo (JP); Shogo Okamoto, Tokyo (JP); Masaya Inoue, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 545 days.

(21) Appl. No.: 14/759,243

(22) PCT Filed: Apr. 26, 2013

(86) PCT No.: PCT/JP2013/062385
§ 371 (c)(1),
(2) Date: Jul. 6, 2015

(87) PCT Pub. No.: WO2014/174666
PCT Pub. Date: Oct. 30, 2014

(65) Prior Publication Data
US 2015/0357877 A1    Dec. 10, 2015

(51) Int. Cl.
*H02K 5/22* (2006.01)
*H02K 1/12* (2006.01)
(Continued)

(52) U.S. Cl.
CPC ............... *H02K 5/225* (2013.01); *H02K 1/12* (2013.01); *H02K 3/50* (2013.01); *H02K 1/185* (2013.01);
(Continued)

(58) Field of Classification Search
CPC .......... H02K 1/12; H02K 1/185; H02K 3/522; H02K 3/50; H02K 5/22; H02K 5/225; H02K 2203/09
(Continued)

(56) References Cited

U.S. PATENT DOCUMENTS

2007/0278875 A1    12/2007 Haga et al.
2007/0278876 A1    12/2007 Haga et al.
(Continued)

FOREIGN PATENT DOCUMENTS

JP    2005-130665 A    5/2005
JP    2007-325482 A    12/2007
(Continued)

OTHER PUBLICATIONS

International Search Report for PCT/JP2013/062385 dated Jun. 4, 2013.

*Primary Examiner* — Bernard Rojas
*Assistant Examiner* — Rashad Johnson
(74) *Attorney, Agent, or Firm* — Sughrue Mion, PLLC; Richard C. Turner (57) ABSTRACT

A fixing member (14) formed of an annular metal material is molded integrally with a connecting plate (13) to constitute a connecting plate structure (9), said connecting plate (13) consisting of a plurality of bus bars (11) and a holder (12) for fixing and holding the bus bars. The fixing member (14) has an annular portion (14a) touching a frame (8) for holding a stator (4), and the connecting plate structure (9) is fixed to the frame (8) by the whole or a part of the surface of the annular portion.

12 Claims, 5 Drawing Sheets

(51) Int. Cl.
  *H02K 3/50* (2006.01)
  *H02K 1/18* (2006.01)
  *H02K 3/52* (2006.01)

(52) U.S. Cl.
  CPC ......... *H02K 3/522* (2013.01); *H02K 2203/09* (2013.01)

(58) Field of Classification Search
  USPC ..................................................... 310/43, 71
  See application file for complete search history.

(56) References Cited

U.S. PATENT DOCUMENTS

| | | | | |
|---|---|---|---|---|
| 2013/0187517 A1* | 7/2013 | Asao | ....................... | H02K 1/185 310/68 D |
| 2014/0001896 A1* | 1/2014 | Ryu | ....................... | H02K 5/225 310/71 |
| 2014/0028127 A1* | 1/2014 | Chamberlin | ........... | H02K 3/522 310/71 |
| 2014/0028130 A1* | 1/2014 | Sonoda | .................... | H02K 3/28 310/71 |
| 2014/0151146 A1* | 6/2014 | Tanaka | ................. | B62D 5/0406 180/443 |
| 2015/0171709 A1* | 6/2015 | Ito | .......................... | H02K 5/225 310/52 |
| 2015/0229178 A1* | 8/2015 | Murakami | ............... | H02K 3/50 310/71 |
| 2015/0357886 A1* | 12/2015 | Ishizeki | .................. | F04D 25/06 310/71 |
| 2016/0013697 A1* | 1/2016 | Haga | ........................ | H02K 5/04 310/71 |
| 2016/0156246 A1* | 6/2016 | Hotori | .................... | H02K 5/225 310/43 |
| 2017/0163105 A1* | 6/2017 | Lee | ......................... | H02K 1/185 |

FOREIGN PATENT DOCUMENTS

| | | |
|---|---|---|
| JP | 2012-60766 A | 3/2012 |
| JP | 4900215 B2 | 3/2012 |
| JP | 2012-80602 A | 4/2012 |
| JP | 5028869 B2 | 9/2012 |

* cited by examiner

ROTATING ELECTRIC MACHINE

CROSS REFERENCE TO RELATED APPLICATIONS

This application is a National Stage of International Application No. PCT/JP2013/062385 filed Apr. 26, 2013, the contents of which are incorporated herein by reference in their entirety.

TECHNICAL FIELD

The present invention relates to a rotating electric machine and particularly to a rotating electric machine in which as a means for electric connection with a stator, there is utilized a connecting plate that is to hold bus bars spaced a predetermined distance apart from one another by use of holders.

BACKGROUND ART

In some of conventional rotating electric machines, in order to fix a connecting plate, which is configured by making holders integrally fix and hold a plurality of bus bars, to the rotating electric machine, a leg-shaped portion is provided in a holder, of the connecting plate, for fixing and holding bus bars and the leg-shaped portion is fit with and fixed to the outer circumference of the rotor (e.g., refer to Patent Document 1).

In addition, some of conventional rotating electric machines, a connection board is integrally molded with the stator by use of a resin mold (e.g., refer to Patent Document 2).

In addition, some of conventional rotating electric machines, respective fitting portions are provided in a connecting plate and the stator (a hole and a protrusion are provided in the connecting plate and the stator, respectively) so that the connecting plate, which has been fit with the stator, is fixed to the stator through crimping (e.g., refer to Patent Document 3).

PRIOR ART REFERENCE

Patent Document

[Patent Document 1] Japanese Patent No. 5028869 (FIGS. 1 and 5)
[Patent Document 2] Japanese Patent No. 4900215 (FIG. 2)
[Patent Document 3] Japanese Patent Application Laid-Open No. 2012-080602 (FIG. 2)

DISCLOSURE OF THE INVENTION

Problems to be Solved by the Invention

However, in Patent Document 1, the leg-shaped portion is formed of a resin; therefore, there has been a problem that when the rotating electric machine is a high-output and heavy-weight one and is utilized under the condition that a large mechanical load (vibration or impact) is imposed on the connecting plate, the strength thereof is not satisfactory.

Moreover, in Patent Document 2, when the connection structure is fixed, the whole stator needs to be contained in a molding die; therefore, the plant becomes large-scale, and because the stator is formed of components to be assembled, it is technically difficult to appropriately seal the stator.

Furthermore, in Patent Document 3, as is the case with Patent Document 1, there has been a problem that under a high-load environment, the fixing strength is unsatisfactory.

It is required that a rotating electric machine utilized in an electric vehicle or a hybrid electric vehicle is a small-size and high-output one. On the other hand, in order to secure the electric connection and the insulation of a bus bar against inbound vibration or impact, a high-strength and high-rigidity fixing means is required; however, in general, in order to enlarge the fixing strength, a large-scaled method such as upsizing the fixing structure or molding is required; thus, there has been a problem that the connection structure for supplying electricity to the inside of the rotating electric machine is upsized and made heavier.

The present invention has been implemented in order to solve the foregoing problems; the objective thereof is to provide a small-size and easy-to-produce rotating electric machine that is provided with a high-strength and high-rigidity connection structure.

Means for Solving the Problems

A rotating electric machine according to the present invention includes a rotor that is mounted on an outer circumference of a rotation axle and rotates along with the rotation axle; a stator that is disposed in such a way as to face the rotor and includes an iron core provided with a plurality of teeth, insulators provided on both respective ends, in the axis-line direction of the rotation axle, of the iron core, and a coil wound around the teeth through the intermediary of the insulator; a frame that is formed of a metal material and fixes and holds the stator; and a connecting plate configured with a plurality of bus bars at each of which an end of the coil and a power-supply unit are connected with each other and that are each formed of a conductive material and a holder that is formed of an insulating material and integrally fixes and holds the plurality of bus bars. In the rotating electric machine, a fixing member that has an annular shape around the axis line of the rotation axle and is formed of a metal material is molded integrally with the connecting plate so that a connecting plate structure is configured, and the connecting plate structure is fixed to a supporting body for the stator by utilizing an annular portion of the fixing member, as an abutting face.

Moreover, in the connecting plate structure, an annular portion of the fixing member is bonded to the frame and also abuts on the insulator.

Advantage of the Invention

In a rotating electric machine according to the present invention, the connecting plate and the annular fixing member of the connecting plate structure are formed integrally with each other; therefore, the connecting plate structure itself has high rigidity. Moreover, because metal-to-metal junction is made between the fixing member and the rotating electric machine, compact and high-strength bonding can readily be achieved and hence the rotating electric machine can be downsized. Accordingly, the connecting plate can be assembled in the rotating electric machine without utilizing large-scaled production facilities.

The foregoing and other object, features, aspects, and advantages of the present invention will become more apparent from the following detailed description of the present invention when taken in conjunction with the accompanying drawings.

BEST MODE FOR CARRYING OUT THE INVENTION

Hereinafter, Embodiments of a rotating electric machine according to the present invention will be explained with reference to the drawings. In each of the drawings, the same reference characters denote the same or similar constituent elements.

Embodiment 1

Figure 1:
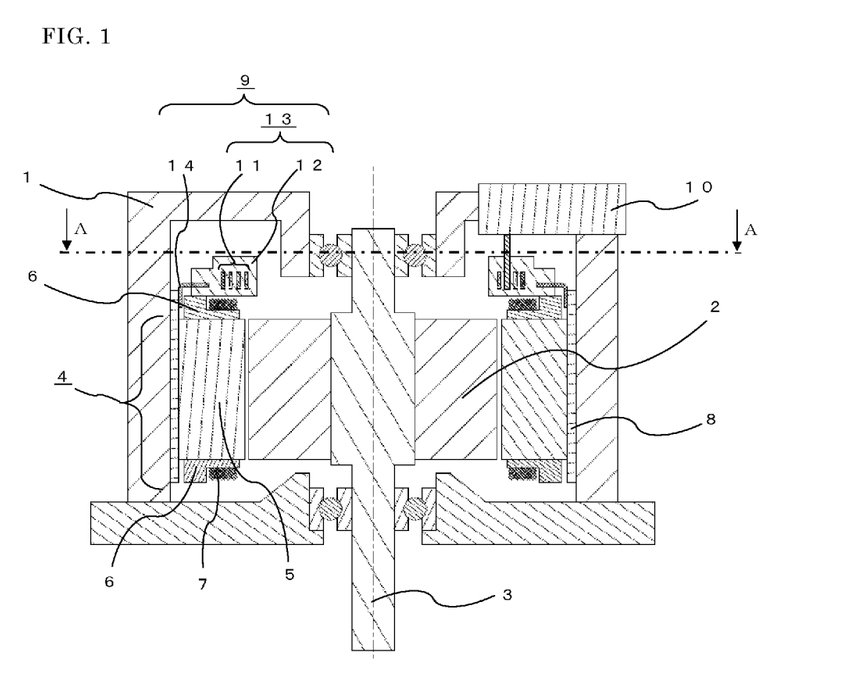
FIG. 1 is a cross-sectional view illustrating a rotating electric machine according to Embodiment 1 of the present invention.
Figure 2:
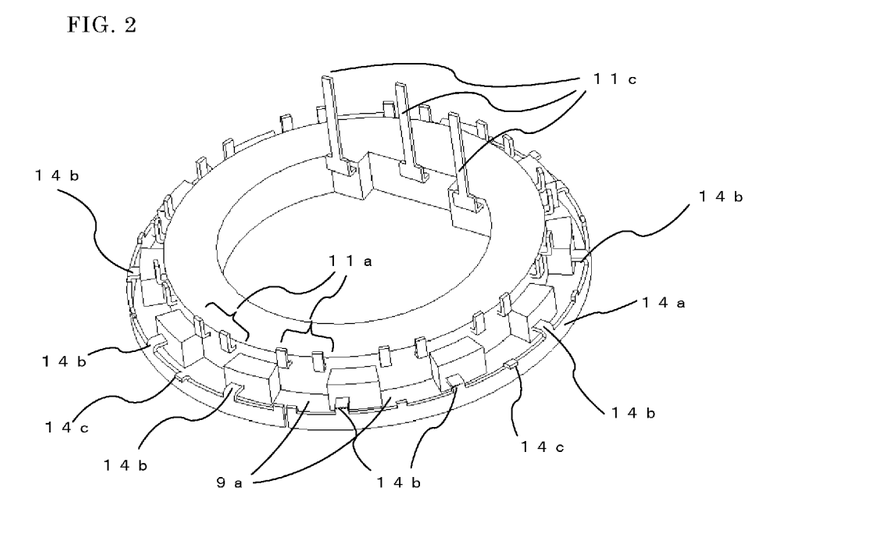
FIG. 2 is a perspective view illustrating a connecting plate structure according to Embodiment 1 of the present invention.
Figure 3:
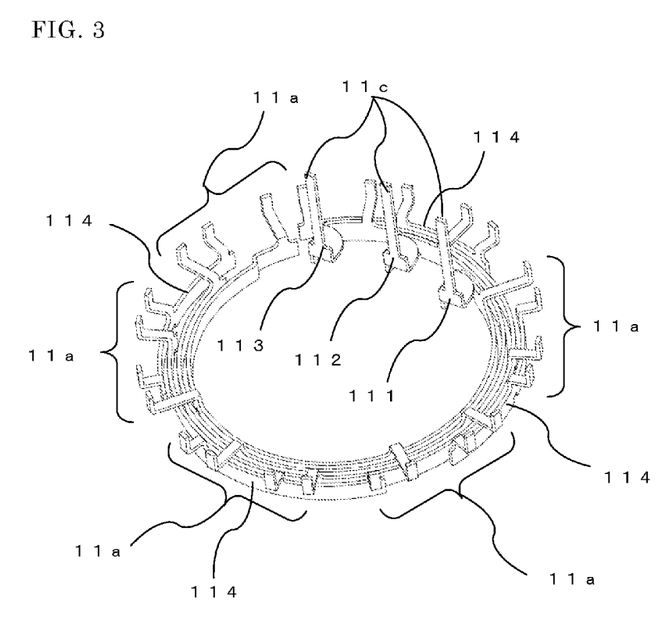
FIG. 3 is a perspective view illustrating the shape of a bus bar according to Embodiment 1 of the present invention.

FIG. 1 is a cross-sectional view illustrating a rotating electric machine according to Embodiment 1 of the present invention; FIG. 2 is a perspective view illustrating a connecting plate structure according to Embodiment 1; FIG. 3 is a perspective view illustrating the shape of a bus bar according to Embodiment 1. At first, the overall configuration will be explained with reference to FIG. 1. In FIG. 1, a rotation axle 3 is pivotably mounted in a housing 1; a rotor 2 is mounted on the outer circumference of the rotation axle 3 and rotates along with the rotation axle 3. Around the axis line of the rotation axle 3, a stator 4 is provided in the outer circumference of the rotor 2 in such a way as to face the rotor 2. The stator 4 is configured with an iron core 5 with a plurality of tooth portions at the inner circumference side thereof, an insulator 6 provided at both axis-direction ends of the tooth portion, and a coil 7 wound around the tooth portion through the intermediary of the insulator 6; the stator 4 is mounted inside the housing 1 through the intermediary of a metal frame 8.

An after-mentioned connecting plate structure 9, which will be explained with reference to FIG. 2, is fixed in such a way that the bottom surface thereof in the axis-line direction of the rotation axle 3 abuts on the insulator 6, and is also fixed to the frame 8 in such a way as to abut on the inner circumference of the frame 8.

The same-phase ends of the coils 7 are connected with one another by way of the connecting plate structures 9; the coils 7 of some phases are connected with predetermined terminals of power-supply unit 10.

Next, the configuration of the connecting plate structure 9 will be explained with reference to FIGS. 1 and 2. The connecting plate structure 9 is configured with a plurality of bus bars 11, a connecting plate 13 including the plurality of bus bars 11 and a holder 12 that holds the plurality of bus bars 11 at respective places where they are placed so as to secure an enough insulation distance from one another and conductive components in the vicinity thereof, and a fixing member 14 that is formed of an tabular metal material and is integrally molded with the connecting plate 13.

As illustrated in FIG. 2, the fixing member 14 is configured with an annular portion 14a that is bent in the plate-thickness direction so as to be formed in an annular shape; a plurality of leg portions 14b that each protrude from one axis-direction end of the annular portion 14a and are then bent in the radial direction and whose front ends are each integrated with the respective side faces of the connecting plates 13, and a plurality of protruding portions 14c provided in the annular portion 14a.

As a result, in the connecting plate structure 9, a plurality of openings 9a are formed between the connecting plate 13 and the fixing member 14, while each of the leg portions 14b is inserted between the openings 9a in the circumferential direction.

Next, the shape of the bus bar 11 will be explained with reference to FIG. 3. The bus bar 11 includes bus bars 114 where the respective neutral points of the coil ends 7a (refer to after-mentioned FIG. 4) are connected with one another and three bus bars 111, 112, and 113 to which the respective coil ends 7a of U-phase, V-phase, and W-phase are connected and that are connected with the respective corresponding points of the power-supply unit 10. In each of the bus bars 111, 112, 113, and 114, a plurality of coil connection terminals 11a for connection thereof with corresponding coil ends 7a are provided; the bus bar annular portion 14a connects the coil connection terminals 11a. Each of the bus bars 111, 112, and 113 has a power-supply terminal 11c for connection thereof with the power-supply unit 10.

Next, the structure for connecting the rotating electric machine with the connecting plate structure 9 that is configured in such a manner as described above will be explained with reference to FIGS. 4 through 6.

Figure 4:
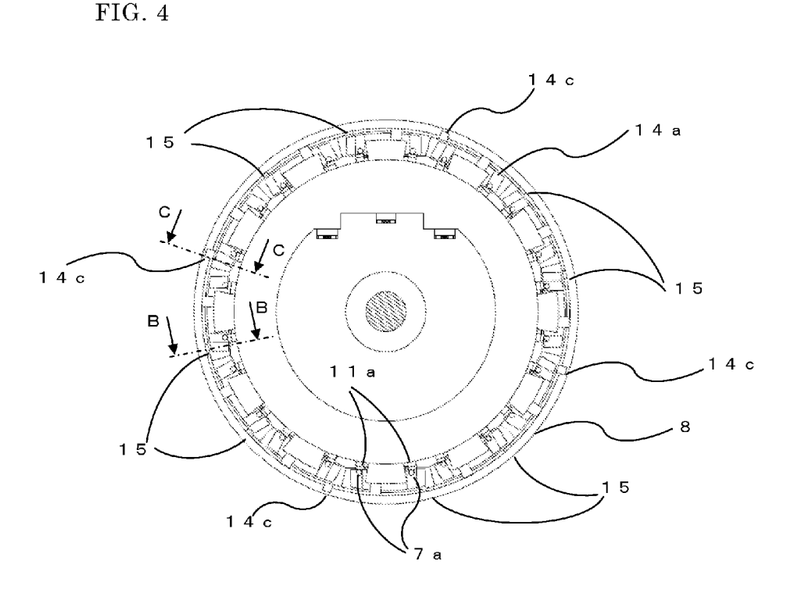
FIG. 4 is a plan view illustrating the rotating electric machine when the cross section A in FIG. 1 is viewed from top side.
Figure 5:
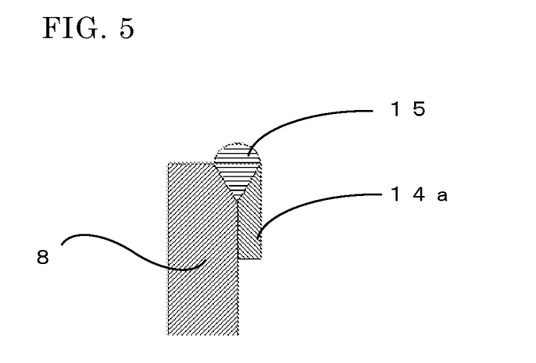
FIG. 5 is a partial cross-sectional view illustrating the vicinity of a junction portion taken along the cross section B in FIG. 4.
Figure 6:
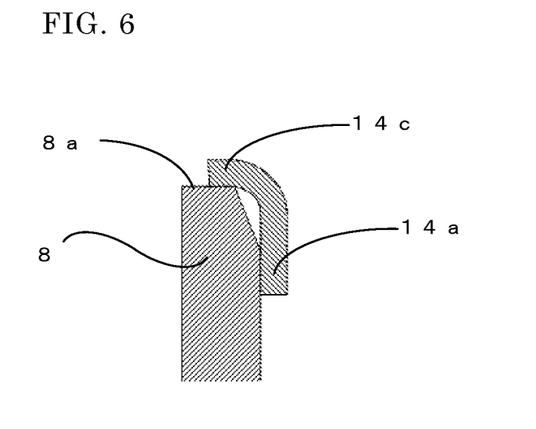
FIG. 6 is a partial cross-sectional view illustrating the vicinity of a protrusion taken along the cross section C in FIG. 4.

FIG. 4 is a plan view illustrating the rotating electric machine when the cross section A in FIG. 1 is viewed from top side; FIG. 5 is a partial cross-sectional view illustrating the vicinity of a bonding portion taken along the cross section B in FIG. 4; FIG. 6 is a partial cross-sectional view illustrating the vicinity of a protruding portion taken along the cross section C in FIG. 4. As illustrated in FIGS. 4 through 6, the annular portion 14a abuts on the inner circumferential surface of the frame 8 and the protruding portion 14c abuts on an end 8a, in the axis direction of the rotation axle, of the frame 8 so that the connecting plate structure 9 is mounted on the frame 8 for holding the stator 4; the connecting plate structure 9 is bonded to the frame 8 through a plurality of welding portions 15, each of which is provided at abutting face where the annular portion 14a and the inner circumferential surface of the frame 8 abut on each other.

As the bonding method in Embodiment 1, TIG welding is utilized; however, the bonding can also be performed by another method such as MIG welding, spot welding, or the like.

The coil end 7a and the coil connection terminal 11a are connected with each other through the opening 9a.

The rotating electric machine, according to Embodiment 1 of the present invention, that is configured in such a manner as described above makes it possible to obtain the following superior actions and effects.

(1) The connecting plate structure 9 and the fixing member 14 formed of a metal material are integrally molded with each other; therefore, high strength and rigidity can be obtained.

(2) Because the bonding of the connecting plate structure 9 with the frame 8 is bonding of metals, the small bonding portion 15 makes it possible to obtain high bonding strength.

(3) Because the connecting plate structure 9 is mounted on the frame 8 in such a way that the annular portion 14a is along the frame 8, no fixing structure in addition to the foregoing small bonding portion 15 occupies a large amount of space. Accordingly, the rotating electric machine can be downsized.

(4) Because fixed at two points by the insulator 6 and the frame 8, the connecting plate structure 9 is mounted with high strength and rigidity.

(5) The radial-direction positioning of the connecting plate structure 9 is performed with the inner circumferential surface of the frame 8 and the annular portion 14a, and the axis-direction positioning thereof can be performed with the protruding portion 14c and the end 8a, in the axis direction of the rotation axle, of the frame 8. Accordingly, the mounting position thereof can readily be set with a high accuracy and hence the productivity is raised.

(6) Because welded to the frame 8, the connecting plate structure 9 can be fixed without utilizing any additional component such as a screw, a resin, or the like. Moreover, it is not required to provide a place to be filled with a resin or a mounting structure such as a screw hole or the like; therefore, the bonding portion an be downsized.

(7) Because in the connecting plate structure 9, the coil end 7a and the coil connection terminal 11a are connected with each other through the opening 9a, it is not required to make the wiring lead go in a roundabout manner and hence the structure around the connecting plate can be downsized.

(8) Moreover, because the opening 9a is provided, a fluid inside the rotating electric machine can circulate through the opening 9a, and the axis-direction ends of the connecting plate 13 and the coil 7 and the axis-direction end of the iron core can widely be exposed. Furthermore, because the fixing structure does not occupy a large amount of space, the flow path of the fluid that circulates inside the rotating electric machine can be enlarged. Therefore, the stator 4 and the connecting plate 13 can effectively be cooled.

(9) In the connecting plate structure 9, the leg portion 14b of the fixing member 14 is bent and the annular portion 14a has a cylindrical shape in which the radial-direction thickness thereof is larger than the axis-direction thickness thereof, so that a rigid cubic structure is formed. Accordingly, the strength and the rigidity of the structure can effectively be raised with less amount of materials.

Embodiment 2

Figure 7:
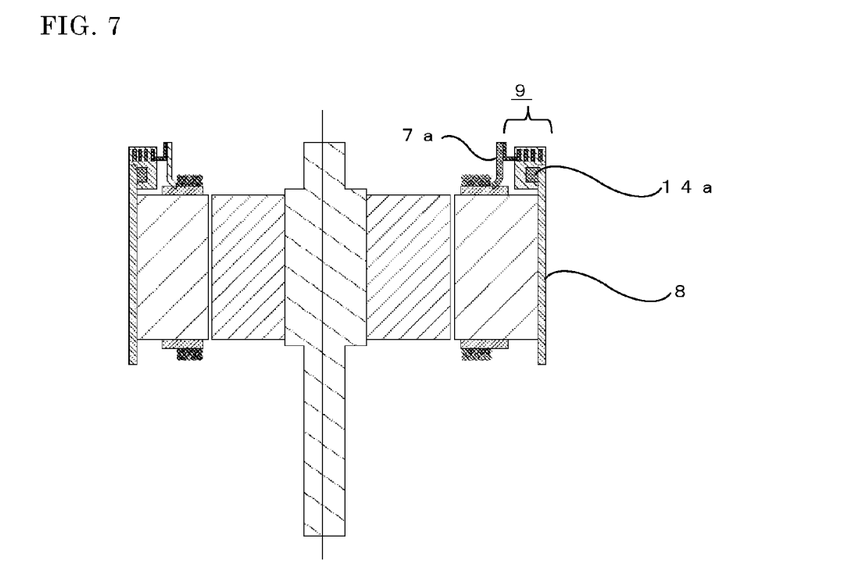
FIG. 7 is a cross-sectional view illustrating the part, of a rotating electric machine according to Embodiment 2 of the present invention, that is obtained by removing a housing.

FIG. 7 is a cross-sectional view illustrating the part, of a rotating electric machine according to Embodiment 2 of the present invention, that is obtained by removing a housing. In a rotating electric machine according to Embodiment 2, when the fixing member 14 is integrally molded with the connecting plate 13, the annular portion 14a is directly berried in the connecting plate 13. In Embodiment 2, the annular portion 14a, which is a complete ring without any seam, is inserted into the connecting plate 13; the connecting plate stricture 9 is pressed into the inner circumferential surface of the frame 8 at the exposed face of the annular portion 14a.

In the configuration according to Embodiment 2, the connecting plate structure 9 is fixed only by being pressed into the frame 8; thus, the assembly process can further be facilitated. In Embodiment 2, depending on the strength required for fixing the connecting plate, the fixation can also be performed by means of shrinkage fitting.

In addition, because the connecting plate 13 is directly fixed to the frame 8, high strength and rigidity can be obtained.

Embodiment 3

Figure 8:
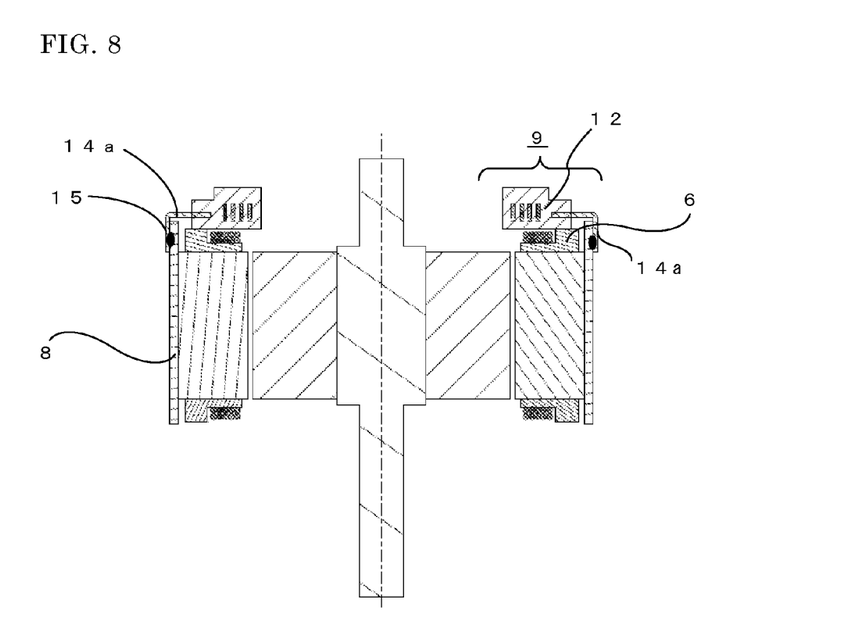
FIG. 8 is a cross-sectional view illustrating the part, of a rotating electric machine according to Embodiment 3 of the present invention, that is obtained by removing a housing.
Figure 9:
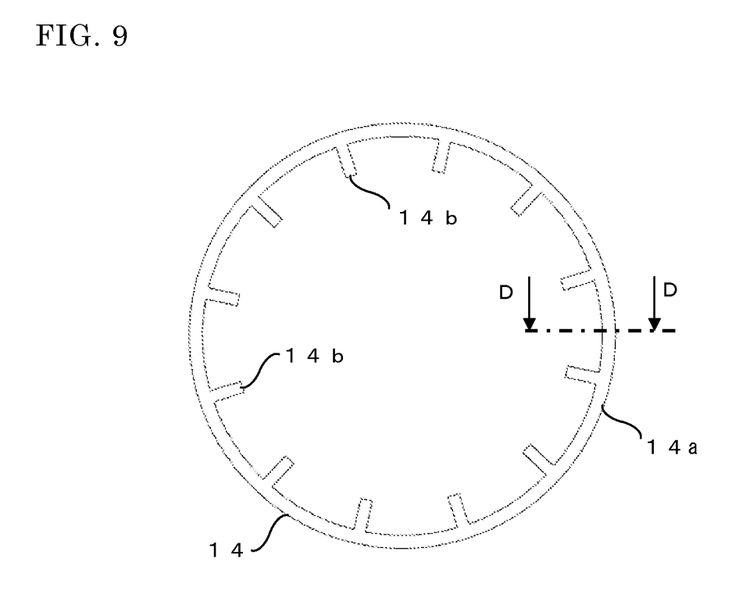
FIG. 9 is a plan view illustrating a fixing member according to Embodiment 3 of the present invention.
Figure 10:
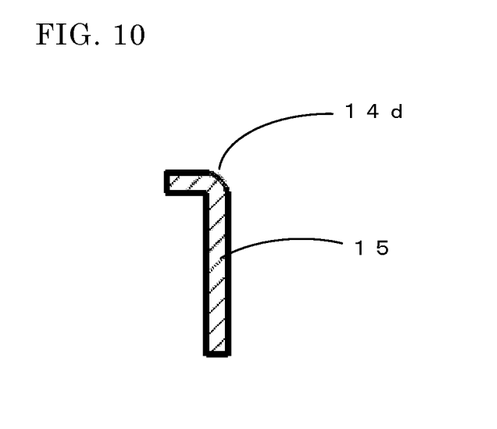
FIG. 10 is a partial cross-sectional view illustrating the fixing member taken along the cross section D in FIG. 9.

FIG. 8 is a cross-sectional view illustrating the part, of a rotating electric machine according to Embodiment 3 of the present invention, that is obtained by removing a housing; FIG. 9 is a plan view illustrating a fixing member according to Embodiment 3; FIG. 10 is a partial cross-sectional view illustrating the fixing member taken along the cross section D in FIG. 9.

In FIGS. 8 through 10, the fixing member 14 is molded by spinning processing and pressing; the annular portion 14a is formed in the shape of a ring without any seam and has bending portions 14d along the whole circumference thereof. The annular portion 14a abuts on the outer circumferential surface of the frame 8, and the connecting plate structure 9 is bonded to the frame 8 through a plurality of welding portions 15 provided along the abutting face. In Embodiment 3, the welding portion 15 is formed by means of spot welding from the side.

When being fixed, the connecting plate structure 9 abuts on the insulator 6 in the axis direction, so that the axis-direction positioning thereof is performed; because being pressed and fixed with a constant weight when the welding is performed, the holder 12 is pressed and fixed to the insulator 6.

In the structure, according to Embodiment 3, configured as described above, the annular portion 14a is a ring without any seam and the fixing member 14 has bending portions 14d along the whole circumference thereof except for the leg portions 14b; therefore, further higher strength and rigidity can be obtained.

INDUSTRIAL APPLICABILITY

The present invention relates to a connection structure of a rotating electric machine to be mounted in a vehicle and is useful when applied to a small-size and high-output-required rotating electric machine for an electric automobile or a hybrid vehicle.

DESCRIPTION OF REFERENCE NUMERALS

1: housing
2: rotor
3: rotation axle
4: stator
5: iron core
6: insulator
7: coil
7a: coil end
8: frame
8a: frame end 9: connecting plate structure
9a: opening
10: power-supply unit
11, 111, 112, 113, and 114: bus bar
11a: coil connection terminal
11c: power-supply terminal
12: holder
13: connecting plate
14: fixing member
14a: annular portion
14b: leg portion
14c: protruding portion
14d: bending portion
15: welding portions

The invention claimed is:

1. A rotating electric machine comprising:
 a rotor that is mounted on an outer circumference of a rotation axle and rotates along with the rotation axle;
 a stator that is disposed in such a way as to face the rotor and includes an iron core provided with a plurality of teeth, insulators provided on both respective ends, in the axis-line direction of the rotation axle, of the iron core, and a coil wound around the teeth through the intermediary of the insulator;
 a frame that is formed of a metal material and fixes and holds the stator; and
 a connecting plate configured with a plurality of bus bars at each of which an end of the coil and a power-supply unit are connected with each other and that are each formed of a conductive material and a holder that is formed of an insulating material and integrally fixes and holds the plurality of bus bars,
 wherein a fixing member that has an annular shape around the axis line of the rotation axle and is formed of a metal material is molded integrally with the connecting plate so that a connecting plate structure is configured, and
 wherein the connecting plate structure is fixed to a supporting body for the stator by utilizing an annular portion of the fixing member, as an abutting face.

2. The rotating electric machine according to claim 1, wherein in the connecting plate structure, an annular portion of the fixing member is bonded to the frame and also abuts on the insulator.

3. The rotating electric machine according to claim 2, wherein a protrusion that hangs on an end, in the axis-line direction of the rotation axle, of the frame is formed in the fixing member of the connecting plate structure.

4. The rotating electric machine according to claim 2, wherein the connecting plate structure is fixed by making the fixing member welded with, pressed into, or shrinkage-fitted in the frame.

5. The rotating electric machine according to claim 2, wherein the connecting plate structure has a plurality of leg portions formed in the circumferential direction of the annular portion of the fixing member and is molded integrally with the connecting plate at the leg portion, and there are provided a plurality of openings, between the connecting plate and the fixing member, that are partitioned in the circumferential direction.

6. The rotating electric machine according to any one of claim 1, wherein a protrusion that hangs on an end, in the axis-line direction of the rotation axle, of the frame is formed in the fixing member of the connecting plate structure.

7. The rotating electric machine according to claim 6, wherein the connecting plate structure is fixed by making the fixing member welded with, pressed into, or shrinkage-fitted in the frame.

8. The rotating electric machine according to claim 6, wherein the connecting plate structure has a plurality of leg portions formed in the circumferential direction of the annular portion of the fixing member and is molded integrally with the connecting plate at the leg portion, and there are provided a plurality of openings, between the connecting plate and the fixing member, that are partitioned in the circumferential direction.

9. The rotating electric machine according to any one of claim 1, wherein the connecting plate structure is fixed by making the fixing member welded with, pressed into, or shrinkage-fitted in the frame.

10. The rotating electric machine according to claim 9, wherein the connecting plate structure has a plurality of leg portions formed in the circumferential direction of the annular portion of the fixing member and is molded integrally with the connecting plate at the leg portion, and there are provided a plurality of openings, between the connecting plate and the fixing member, that are partitioned in the circumferential direction.

11. The rotating electric machine according to any one of claim 1, wherein the connecting plate structure has a plurality of leg portions formed in the circumferential direction of the annular portion of the fixing member and is molded integrally with the connecting plate at the leg portion, and there are provided a plurality of openings, between the connecting plate and the fixing member, that are partitioned in the circumferential direction.

12. The rotating electric machine according to claim 11, wherein in the connecting plate structure, the axis-direction thickness of the annular portion of the fixing member is larger than the radial-direction thickness thereof.

* * * * *